US012766688B2

(12) United States Patent
Li et al.

(10) Patent No.: US 12,766,688 B2
(45) Date of Patent: Oct. 20, 2026

(54) HEAD AND BODY RAPID REPLACING STRUCTURE OF MULTI-FUNCTIONAL POWER TOOL AND MULTI- FUNCTIONAL POWER TOOL

(71) Applicant: Zhejiang Deshuo Electric Appliance Co., Ltd., Jinhua (CN)

(72) Inventors: Yuehui Li, Jinhua (CN); Xiao Long, Jinhua (CN)

(73) Assignee: Zhejiang Deshuo Electric Appliance Co., Ltd., Zhejiang (CN)

(*) Notice: Subject to any disclaimer, the term of this patent is extended or adjusted under 35 U.S.C. 154(b) by 906 days.

(21) Appl. No.: 18/078,892

(22) Filed: Dec. 9, 2022

(65) Prior Publication Data

US 2023/0108174 A1 Apr. 6, 2023

Related U.S. Application Data

(63) Continuation of application No. PCT/CN2020/106163, filed on Jul. 31, 2020.

(30) Foreign Application Priority Data

Jun. 11, 2020 (CN) ......................... 202010529752.2

(51) Int. Cl.
*B25F 3/00* (2006.01)

(52) U.S. Cl.
CPC ...................................... *B25F 3/00* (2013.01)

(58) Field of Classification Search
CPC ... B25F 3/00; B25F 5/02; B23B 45/02; B23D 57/023
USPC ..... 173/1–2, 13, 18–20, 184, 25–31, 38–39, 173/45–53
See application file for complete search history.

(56) References Cited

U.S. PATENT DOCUMENTS 2,648,996 A * 8/1953 Macdougall ............ F16D 65/60 74/522
5,033,552 A * 7/1991 Hu .......................... B25B 21/00 241/37.5
5,269,733 A * 12/1993 Anthony, III ......... B25B 21/026 173/171
5,692,574 A * 12/1997 Terada ................. B25D 17/043 173/162.2
11,504,830 B2 * 11/2022 Gordon ............... B25B 23/0028
(Continued)

FOREIGN PATENT DOCUMENTS

CN 103722537 A * 4/2014
CN 111360767 A * 7/2020 ................ B25F 5/00
(Continued)

*Primary Examiner* — Robert F Long
(74) *Attorney, Agent, or Firm* — JEEN IP LAW, LLC

(57) ABSTRACT

The present invention discloses a head and body rapid replacing structure of a multi-functional power tool and a multi-functional power tool. The rapid replacing structure comprises a body shell; a torsion ring which is rotationally arranged beside a socket in the body shell and of which the axis is at least parallel to that of the socket; a head detachably inserted in a jack of the torsion ring; an energy storage device resetting after driving the torsion ring to rotate; and head locking pieces that can move in a straight line between a first position and a second position along the direction perpendicular to the axis of the torsion ring during the rotation of the torsion ring.

9 Claims, 13 Drawing Sheets

(56) References Cited

U.S. PATENT DOCUMENTS

| | | | | |
|---|---|---|---|---|
| 2001/0005068 | A1* | 6/2001 | Gifford | B23Q 3/12 408/239 R |
| 2010/0032179 | A1* | 2/2010 | Hanspers | B25F 5/00 173/11 |
| 2013/0020103 | A1* | 1/2013 | Mcclaskey | B25F 3/00 173/29 |
| 2013/0093142 | A1* | 4/2013 | Saur | B23B 31/0261 279/44 |
| 2014/0332243 | A1* | 11/2014 | Baskar | B25F 5/02 173/29 |
| 2015/0343583 | A1* | 12/2015 | McRoberts | B23Q 5/045 173/213 |
| 2018/0161951 | A1* | 6/2018 | Billings | F21V 23/0471 |
| 2019/0015963 | A1* | 1/2019 | Moylan | B25F 3/00 |
| 2019/0217459 | A1* | 7/2019 | Gregorich | B23D 51/16 |
| 2019/0308309 | A1* | 10/2019 | Gregorich | B23B 45/003 |
| 2021/0107131 | A1* | 4/2021 | Kuehne | B25F 5/001 |
| 2022/0193882 | A1* | 6/2022 | Lv | B25F 5/02 |
| 2023/0234193 | A1* | 7/2023 | Xu | B25B 21/02 173/93 |

FOREIGN PATENT DOCUMENTS

| | | | | | |
|---|---|---|---|---|---|
| CN | 111673145 | A | * | 9/2020 | B25F 5/00 |
| CN | 212577577 | U | * | 2/2021 | |
| CN | 212578815 | U | * | 2/2021 | |
| CN | 217620422 | U | * | 10/2022 | |
| CN | 218717322 | U | * | 3/2023 | |
| CN | 119860425 | A | * | 4/2025 | H02K 7/116 |
| CN | 113323864 | B | * | 6/2025 | B08B 3/02 |
| RU | 2819492 | C1 | * | 5/2024 | |
| WO | WO-2025117585 | A1 | * | 6/2025 | B25F 5/02 |

* cited by examiner

HEAD AND BODY RAPID REPLACING STRUCTURE OF MULTI-FUNCTIONAL POWER TOOL AND MULTI- FUNCTIONAL POWER TOOL

CROSS REFERENCE TO RELATED APPLICATION

This patent application is a continuation application of PCT/CN2020/106163, filed on Jul. 31, 2020, which claims the benefit and priority of Chinese Patent Application No. 202011496721.8, filed on Jun. 11, 2020, the disclosure of which is incorporated by reference herein in its entirety as part of the present application.

TECHNICAL FIELD

The present invention relates to the field of power tools, and particularly relates to a head and body rapid replacing structure of a multi-functional power tool and a multi-functional power tool.

BACKGROUND

A handheld tool is a device that controls the start and stop of a motor through a start and stop button to transmit the torque of the motor to a drill, a saw, a grinding disc, a hammer and other components through a certain torsion transmission structure, so as to cause the drill, the saw and the rotating disc to rotate, expand and contract back and forth and joggle.

As the variety and functions of handheld tools become more and more abundant, users usually need to purchase handheld tools with corresponding functions to meet certain use needs, which increases the use cost of users. In view of the basically similar driving structures of the handheld tools, a structure appears that can be detachably assembled with different types of tool holders through a driving structure. In the structure, an elastic clamp fixed on the shell is contracted to be embedded into the clamping slot on the tool holder to realize the fixation of the tool holder. During disassembly, the elastic clamp is driven by pushing the button on the shell to expand to exit from the clamping slot on the tool holder so as to remove the restriction on the tool holder, and thus the tool holder can be taken out.

However, in this structure, the elastic clamp needs a greater force to expand to exit from the clamping slot, which requires higher finger strength of the user and is inconvenient for women and other users.

In addition, the elastic clamp is a metal wire or metal sheet which is often in line contact with the tool holder, the contact area is small, the tolerance is small, the stability of fixation is relatively weak, and the tool holder has certain vibration when working, which affects the operation.

SUMMARY

The purpose of the present invention is to solve the above problems existing in the prior art and to provide a head and body rapid replacing structure of a multi-functional power tool and a multi-functional power tool.

The purpose of the present invention is realized by the following technical solution:

A head and body rapid replacing structure of a multi-functional power tool, comprising:

A body shell;

A torsion ring which is rotationally arranged in the body shell and beside a socket of the body shell and of which the axis is at least parallel to that of the socket;

A head detachably inserted in a jack of the torsion ring;

An energy storage device resetting after driving the torsion ring to rotate;

Head locking pieces that can move in a straight line between a first position and a second position along the direction perpendicular to the axis of the torsion ring during the rotation of the torsion ring;

In the first position, each head locking piece has a blocking part which is located on the movement path of a clamping platform of the head in the jack;

In the second position, each head locking piece does not have a part located on the movement path of the clamping platform.

Preferably, in the head and body rapid replacing structure of a multi-functional power tool, the outer circumferential surface of the torsion ring is provided with an operating panel.

Preferably, in the head and body rapid replacing structure of a multi-functional power tool, the operating panel is integrated or detachably assembled with the torsion ring, and a boss extending from the body shell at least into the arc-shaped hole in the body shell is formed on the outer surface of the operating panel.

Preferably, in the head and body rapid replacing structure of a multi-functional power tool, an arc-shaped through hole for installing the head locking piece is formed in the torsion ring, and the sum of the thickness of the outer part of the arc-shaped through hole and the thickness of the head locking piece is consistent with the width of a clamping slot on the head.

Preferably, in the head and body rapid replacing structure of a multi-functional power tool, the head locking piece has an arc-shaped hole or an inclined hole, a drive pin which is parallel to the axis of the torsion ring and is located on the torsion ring is inserted into the arc-shaped hole or the inclined hole, and the drive pin drives the head locking piece to move between the first position and the second position during the rotation of the torsion ring.

Preferably, in the head and body rapid replacing structure of a multi-functional power tool, guide blocks close to two opposite end faces of the head blocking piece are arranged in the body shell.

Preferably, in the head and body rapid replacing structure of a multi-functional power tool, a guide sleeve coaxial with the drive ring is arranged in the body shell, and the head has a guide hole matched with the guide sleeve.

Preferably, in the head and body rapid replacing structure of a multi-functional power tool, a fixed plate coaxial with the torsion ring is arranged in the body shell, and the spacing between the fixed plate and the head locking piece is equivalent to the width of the clamping platform.

Preferably, in the head and body rapid replacing structure of a multi-functional power tool, an inclined plane leaning from the inner end to the outer side of the outer end is formed on the clamping platform, and the head blocking piece has chamfers matched with the inclined plane.

Preferably, in the head and body rapid replacing structure of a multi-functional power tool, the number of the head locking pieces is at least one pair, and the number of the chamfers is four.

Preferably, in the head and body rapid replacing structure of a multi-functional power tool, the body shell is provided with a steering switch key, and the socket of the body shell is provided with a steering switch locking piece which can be driven to move in a straight line between a third position and a fourth position.

In the third position, the steering switch locking piece does not restrict the movement of the steering switch key.

In the fourth position, the steering switch locking piece restricts the steering switch key to a forward rotation position or a reverse rotation position, or restricts the steering switch key to a locked position and to movement to only one side.

A multi-functional power tool, comprising any of the above head and body rapid replacing structures of a multi-functional power tool.

The technical solution of the present invention has the following advantages:

In the solution, the design is exquisite; the rotation of the torsion ring is used to drive the head locking piece to move in a straight line so as to realize the locking and unlocking of the head and the body shell; a rotary unlocking structure is used instead of a pressing structure; compared with the pressing structure, the rotary structure has a small force to be applied by hands to unlock and has easy operation; and the locking of the solution is realized by the surface contact between the head locking piece and the clamping platform of the head, so the locking stability is good, and the vibration in work can be reduced.

In the solution, the structure of driving the head locking piece to move in a straight line is exquisite in design, simple and easy, and the design of the overall position relation of the head, the torsion ring, the head locking piece and the fixed plate can ensure the locking reliability of the head through the restriction on the end faces of the head, the support force for the head is increased, and the vibration of the head is reduced.

In the solution, the guide sleeve, the guide block and the fixed plate are integrated, the head realizes guiding directly through the square hole and the guide sleeve, the overall structure is compact, and the number of parts and components is small, which is easy to realize industrialization and to popularize and apply.

In the solution, by forming matching inclined planes on the head and the head locking piece, it is only necessary to directly insert the head directly during assembly, without the need to turn the torsion ring, which further reduces the difficulty of operation and improves the convenience of use.

In the solution, the structural design of the steering switch key and the steering switch locking piece can effectively meet the function of one-way operation after the assembly of the head, without the need for manual adjustment of the steering of the motor, which effectively avoids the risk of misoperation or forgetting operation.

DETAILED DESCRIPTION

The purpose, advantages and characteristics of the present invention will be illustrated and explained by the non-restrictive description of preferred embodiments below. These embodiments are only typical examples adopting the technical solution of the present invention. Technical solutions formed by adopting equivalent replacement or equivalent transformation shall be included in the protection scope of the present invention.

It should be noted in the description of the solution that terms such as “central”, “upper”, “lower”, “left”, “right”, “front”, “back”, “vertical”, “horizontal”, “inner”, “outer”, etc. indicate direction or position relationships shown based on the drawings, and are only intended to facilitate the description and the simplification of the description rather than to indicate or imply that the indicted device or element must have a specific direction or constructed and operated in a specific direction, and therefore, shall not be understood as a limitation to the present invention. In addition, the terms such as “first”, “second” and “third” are only used for the purpose of description, rather than being understood to indicate or imply relative importance. Moreover, in the description of the solution, with the operator as reference, the direction near the operator is the near end, and the direction away from the operator is the far end.

Figure 1:
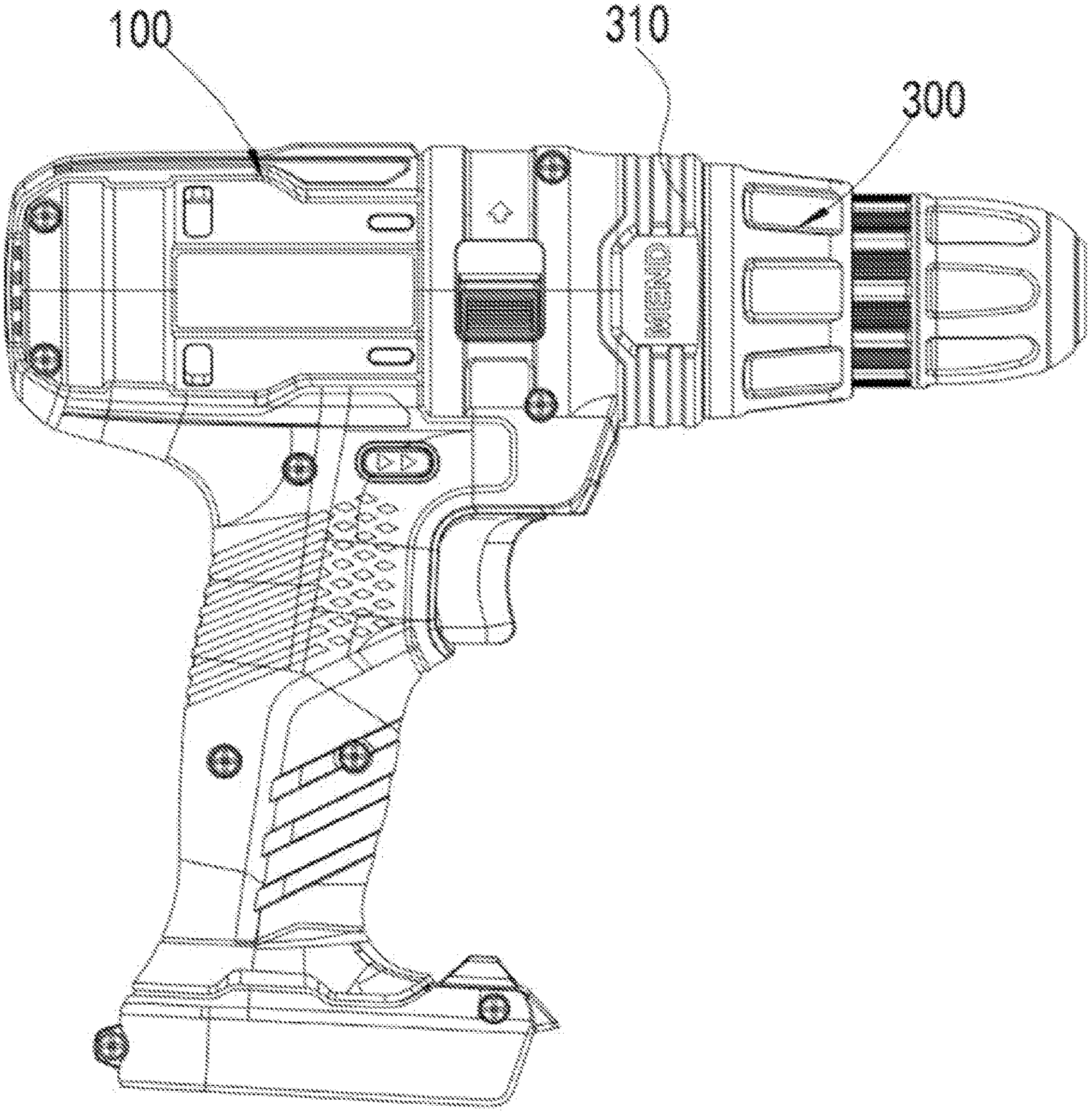
FIG. 1 is a main view of an electric drill as an example of a power tool of the present invention.
Figure 2:
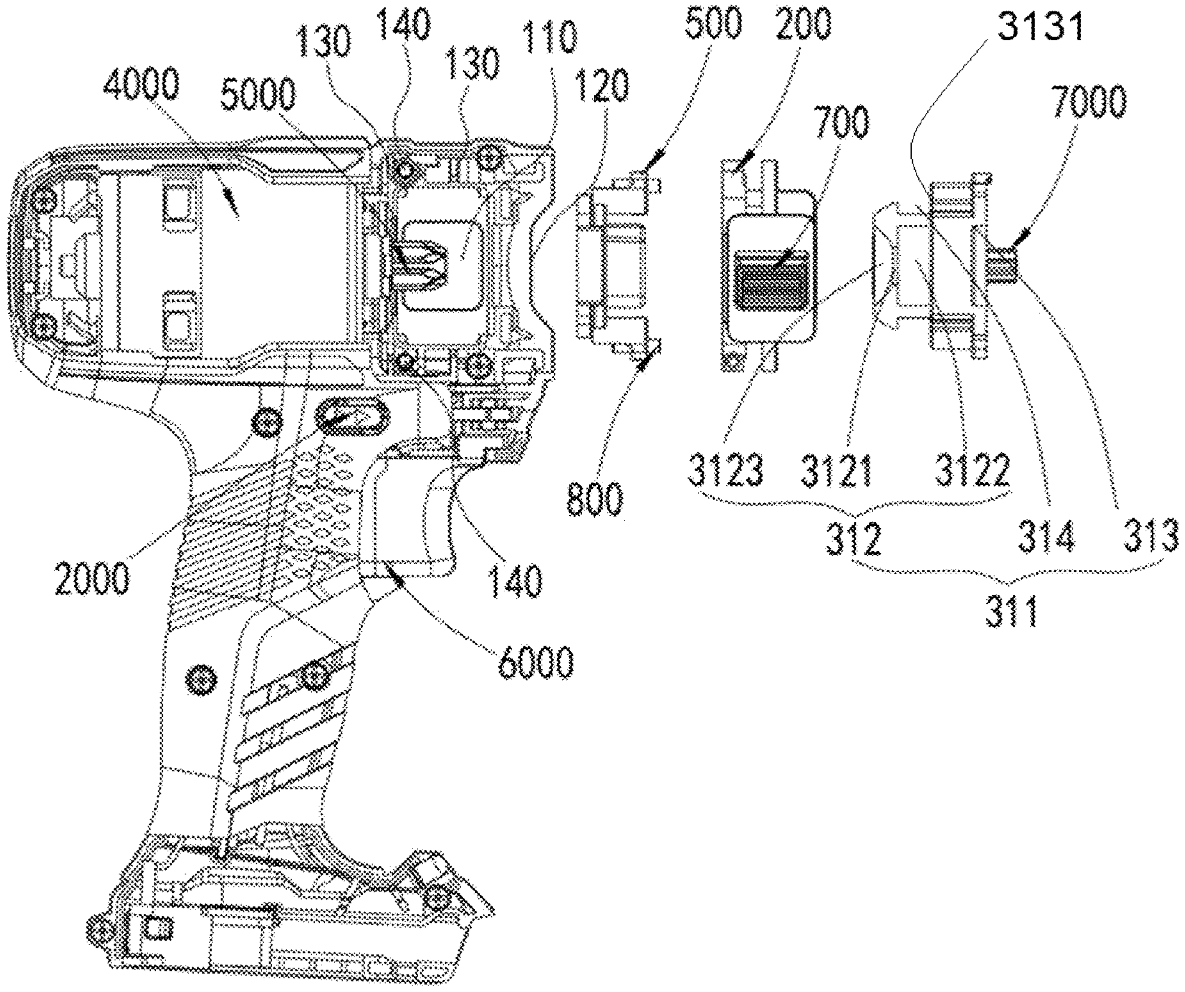
FIG. 2 is a local exploded view of a head and body rapid replacing structure of the present invention (The right half of the body shell and part of structure of the front end of the head are hidden in the figure)

The head and body rapid replacing structure of a multi-functional power tool disclosed by the present invention is described in combination with the attached drawings, as shown in FIG. 1 and FIG. 2, comprising a body shell 100, wherein the body shell 100 is used to provide installation space and provide holding space required for manual operation, and the shape of the body shell 100 can be referenced to the shapes of various existing handheld tools, for example, the shell shape of a gun-shaped drill or the shell shape of a pen-shaped drill. With the gun-shaped drill as an example, the body shell 100 can have a structure with an inner cavity and with a socket on one end, which is formed by combining two symmetrical halves (the structure of the left half is only shown in the figure), and comprises a holding part for hand holding and an installation part, wherein an inner cavity which is nearly circular is formed at the installation part, and the socket 120 is formed on the front end of the installation part.

As shown in FIG. 1 and FIG. 2, the socket 120 of the body shell 100 is detachably connected with a head 300. When the head 300 and the body shell 100 are assembled as a whole, a power source (motor) in the body shell 100 and a power transmission structure in the head 300 can be connected and output the power of the power source to the working head for work so that the power of the power source in the body shell 100 can be output through the head 300 to realize drilling, hammering, cutting and other operations.

Since the head 300 has multiple types according to different functions, such as the head of an electric drill, the head of a reciprocating saw or the head of an electric hammer, the head 300 needs to be replaced according to different use needs in actual use. In order to facilitate replacement, a certain rapid replacing structure needs to be arranged between the head 300 and the body shell 100. The preferred implementation method of the rapid replacing structure and the principle of rapid replacement will be described in detail below.

First of all, as shown in FIG. 2, the shell 310 of the head 300 with different functions comprises a connector 311, the connector 311 comprises a square sleeving part 312 and a limiting part 313, the outer contour of the sleeving part 312 is preferably square, and the center of the sleeving part 312 is a square hole. A clamping platform 3121 extending from the inner end (one end towards the socket of the body shell during assembly) to the outer end for a certain distance is formed on at least one side wall of the sleeving part 312. Preferably, the clamping platform 3121 is respectively formed on four side walls, and the outer peripheries of the four clamping platforms 3121 form a circular contour, so as to avoid interfering with the rotation of the torsion ring 200; and a clamping slot 314 is formed between the clamping platform 3121 and the inner end face of the limiting part 313.

Figure 3:
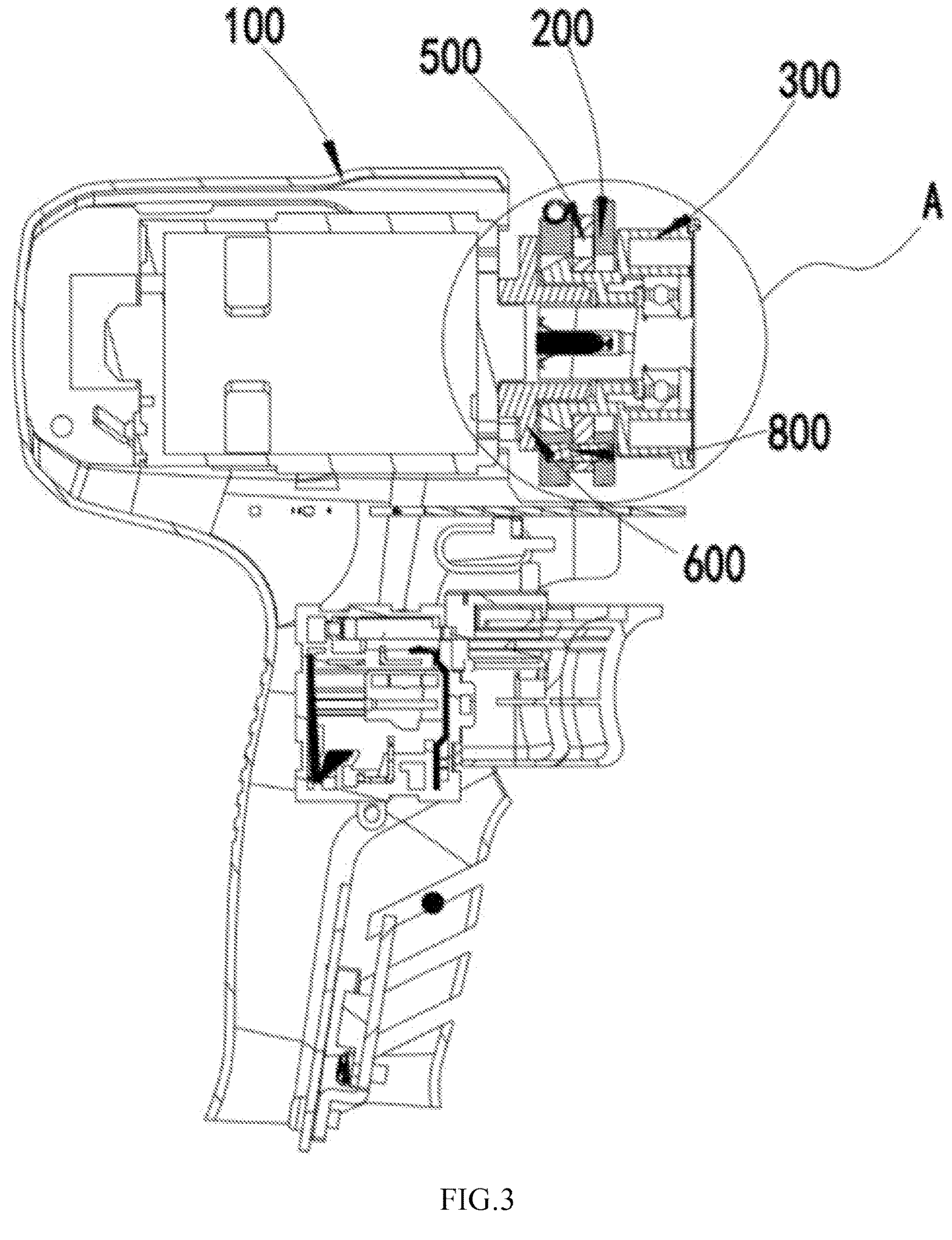
FIG. 3 is a side section view of the assembly state of a head and body rapid replacing structure of the present invention (Part of the structure of the body shell and part of the structure of the front end of the head are hidden in the figure)
Figure 4:
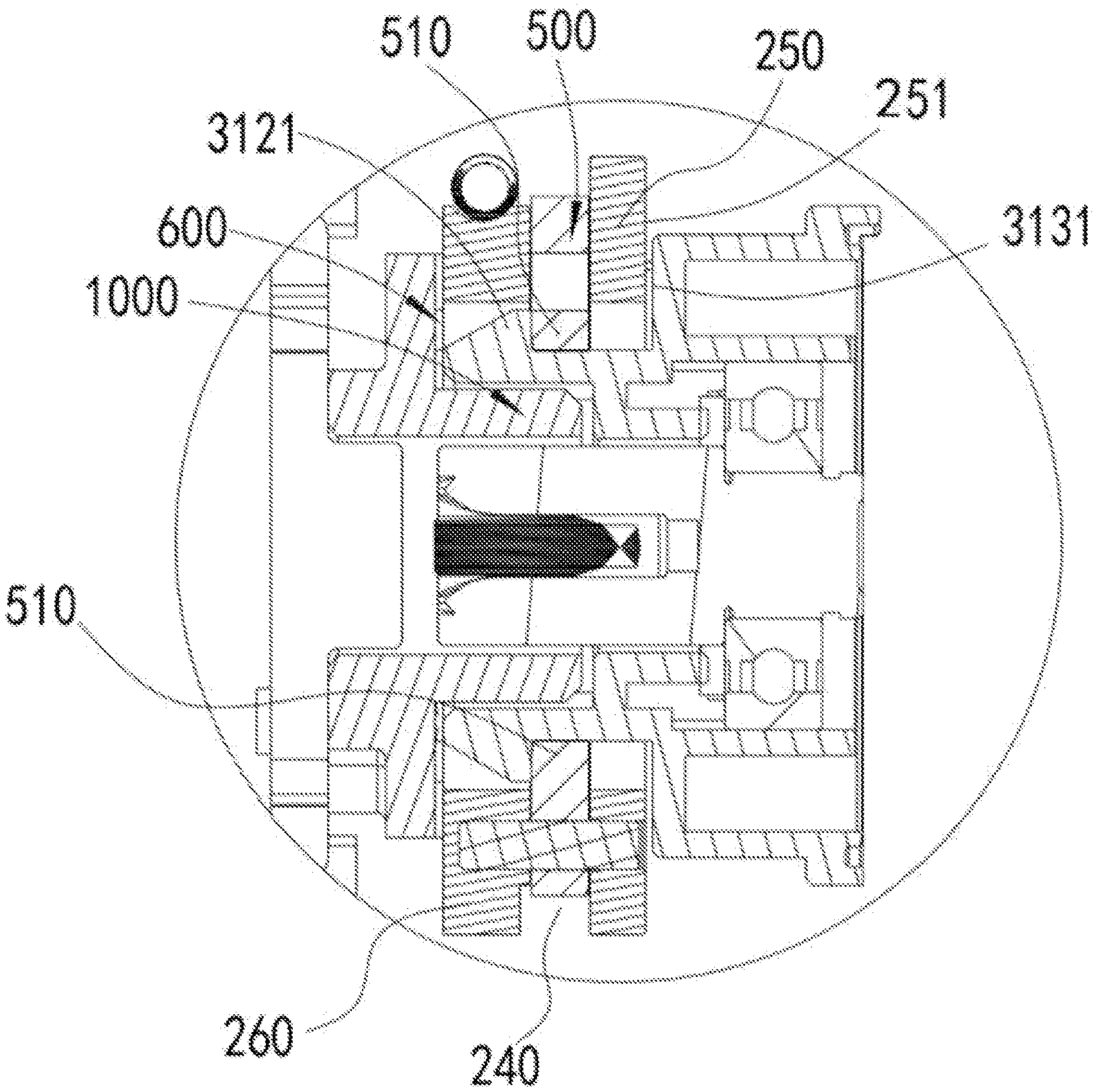
FIG. 4 is an enlarged view of area Ain FIG. 3.

As shown in FIG. 3 and FIG. 4, when the head 300 is required to be locked in the body shell 100, at least one head locking piece 500 in the body shell 100 can be embedded into the clamping slot 314 and fitted to the outer end face (the end face towards the limiting part 313) of the clamping platform 3121. At this time, the head locking piece 500 blocks the movement of the clamping platform 3121, so as to restrict the head 300 from moving out of the body shell 100; and when the head 300 needs to be moved out, the head locking piece 500 is moved out of the clamping slot 314 to remove the restriction of the head locking piece 500 on the movement of the head 300, and then the head 300 can be pulled out from the body shell 100.

Figure 5:
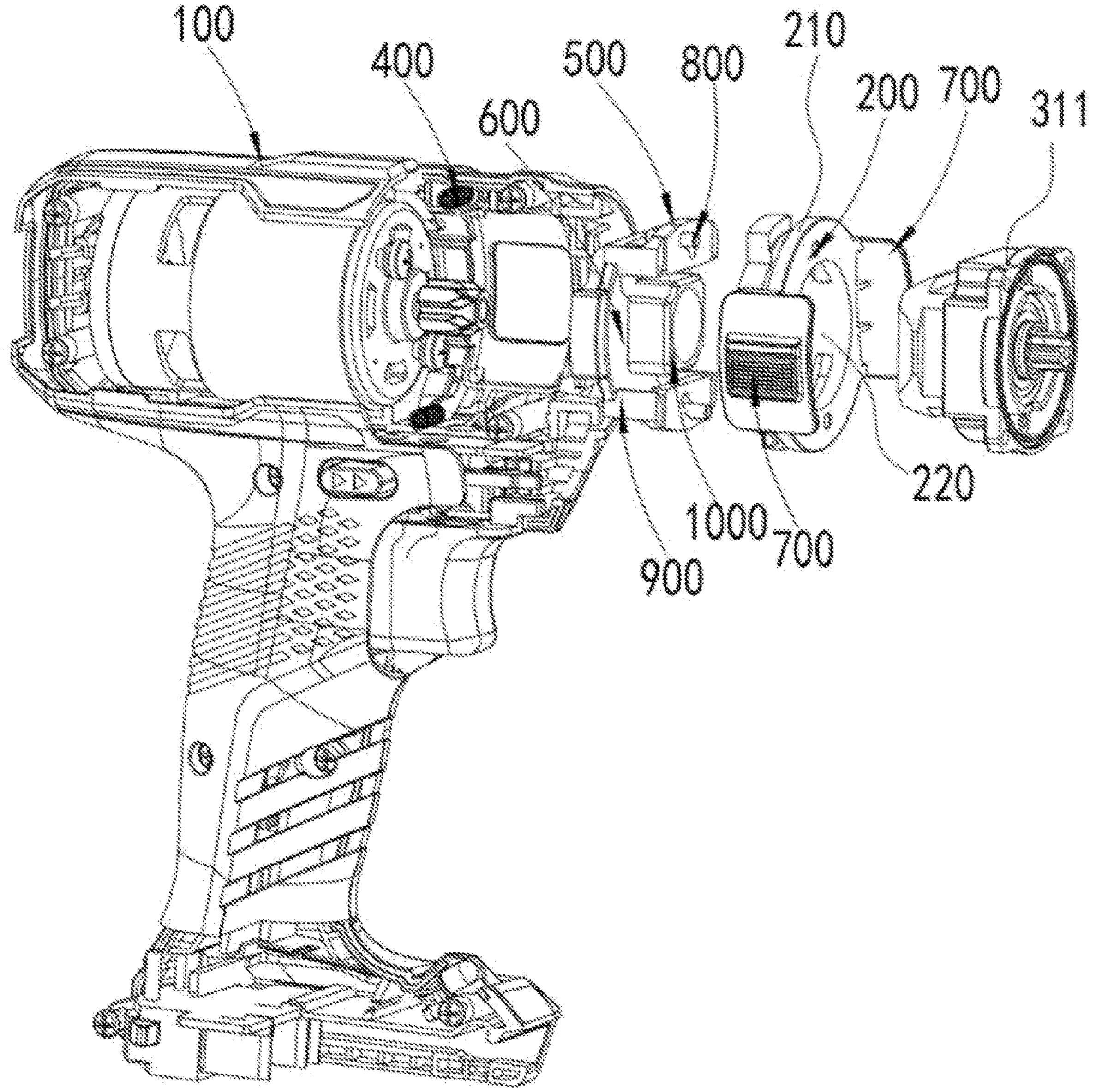
FIG. 5 is a stereoscopic exploded view of a head and body rapid replacing structure of the present invention (The right half of the body shell and part of structure of the front end of the head are hidden in the figure)

The structure that drives the above head locking piece 500 to move between different positions to realize the locking and unlocking of the head is shown below. As shown in FIG. 2, FIG. 3 and FIG. 5, a torsion ring 200 is rotationally arranged in the body shell 100, the axis of the torsion ring 200 is at least parallel to that of the socket of the body shell 100, and the torsion ring 200 can rotate around the axis relative to the body shell 100 under the action of an external force.

Figure 6:
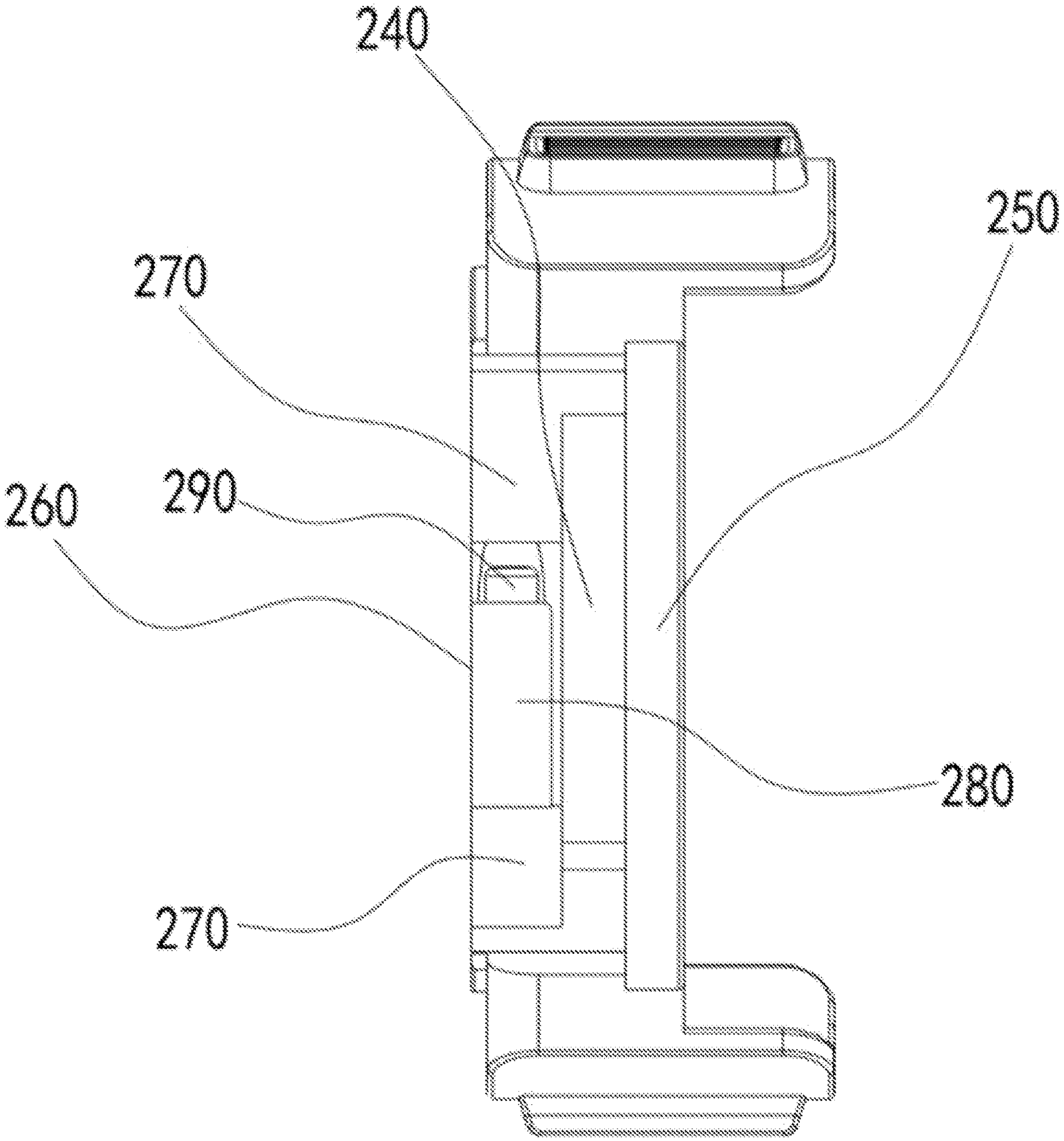
FIG. 6 is a top view of a torsion ring of the present invention.

As shown in FIG. 4 to FIG. 6, the outer contour of the main body 230 of the torsion ring 200 is nearly circular, the center of the torsion ring 200 is a circular jack 220, and at least one arc-shaped through hole 240 is formed on the outer circumferential surface 210. Preferably, two arc-shaped through holes 240 are formed and symmetrically arranged, and the arc length is slightly less than that of the semicircle of the main body 230. Two guide plates 130 with the spacing equivalent to the thickness of the torsion ring 200 are formed in the inner wall of the body shell 100, and constitute a guide groove to restrict the position of the torsion ring 200. The sum of the thickness of the outer part 250 located on the outer side of the arc-shaped through hole 240 and the thickness of the head locking piece 500 is equivalent to the width of the clamping slot 314 so as to effectively restrict the head 300.

Figure 7:
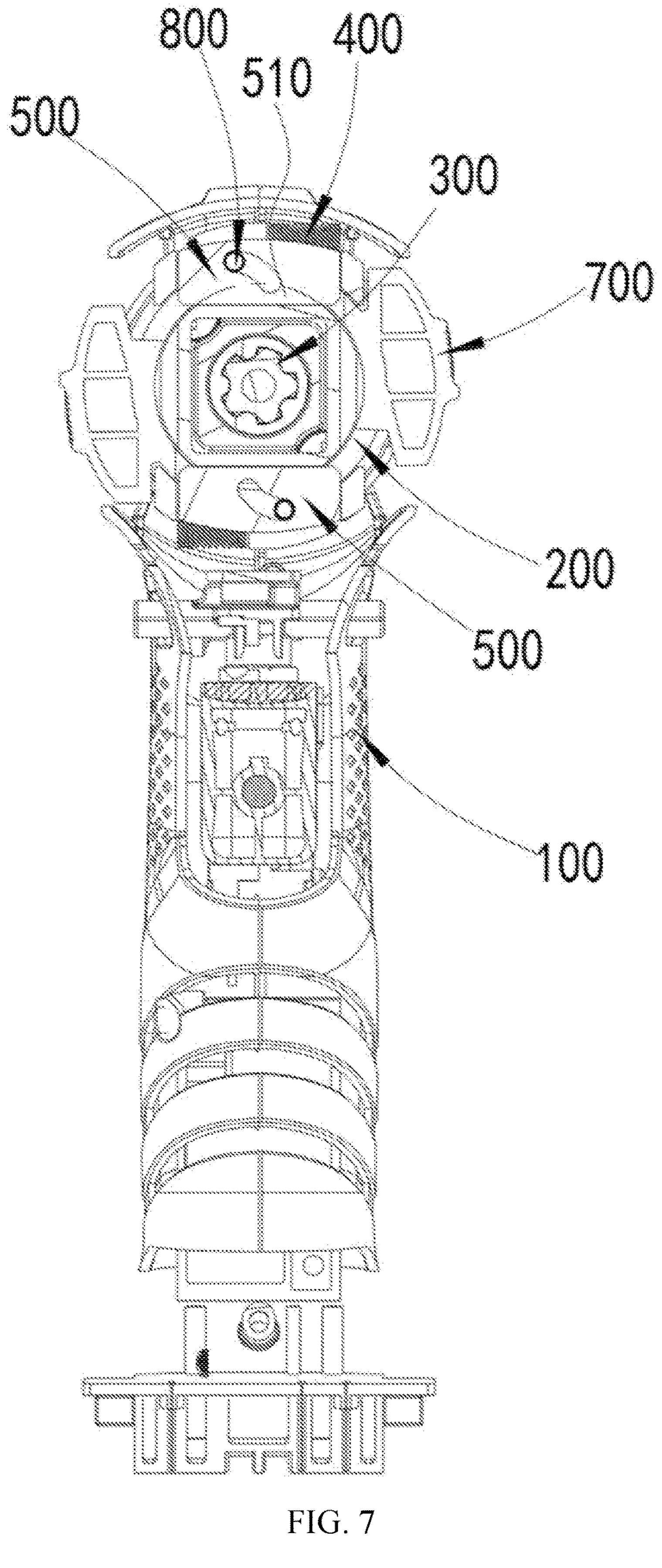
FIG. 7 is an end section view of the assembly state of a head and body rapid replacing structure of the present invention (Part of the structure of the body shell and part of the structure of the front end of the head are hidden in the figure)
Figure 8:
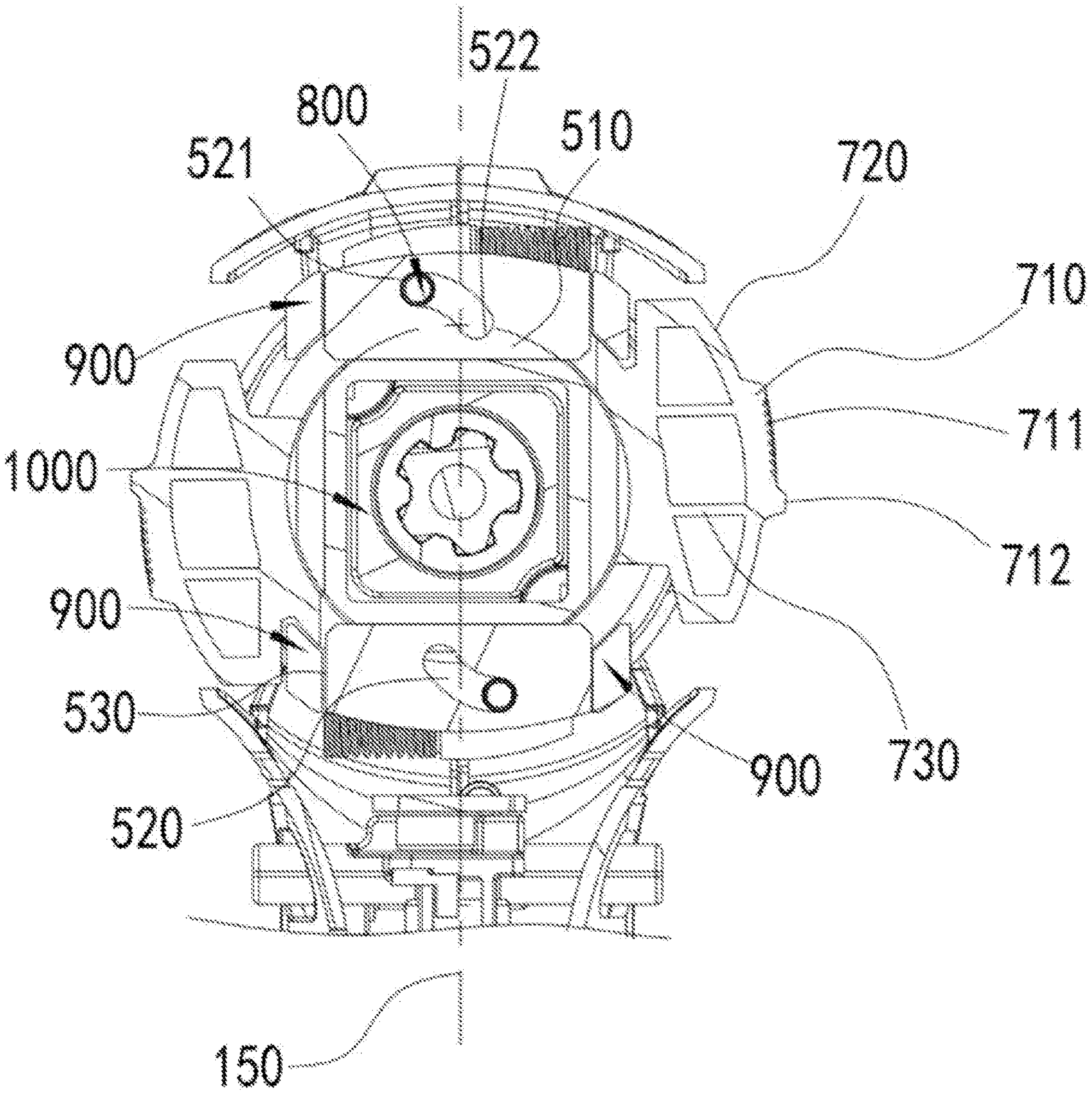
FIG. 8 is an enlarged view of a head and body rapid replacing area in FIG. 7.

In order to facilitate manual operation of the rotation of the torsion ring 200, as shown in FIG. 7, an operating panel 700 is arranged at the outer circumferential surface 210 of the torsion ring 200, and the number of the operating panels 700 can be one, two or more. As shown in FIG. 8, the number of the operating panels is preferably two, and the two operating panels 700 are located between the two arc-shaped through holes 240. Each operating panel 700 comprises an arc-shaped main body 720, and the arc-shaped main body 720 and the outer circumferential surface of the torsion ring 200 can be integrated or assembled. When integrated, a strengthening part 730 is formed between the arc-shaped main body 720 and the torsion ring 200. When assembled, an inserting block or an inserting groove mutually matched is formed on the inner wall of the arc-shaped main body or the outer circumferential surface 210 of the torsion ring 200.

As shown in FIG. 5 or FIG. 8, a boss 710 is formed on the outer surface of the arc-shaped main body 720, and the boss 710 is located in the middle part of the arc-shaped main body 720 and at least embedded into the arc-shaped hole 110 in the body shell 100. The size of the arc-shaped hole 110 is smaller than that of the arc-shaped main body 720, and the boss 710 can move in the arc-shaped hole 110. When the boss 710 is located on one end of the arc-shaped hole 10, the head locking piece 500 can lock the head 300. When the boss 710 moves to the other end of the arc-shaped hole 110, the head locking piece 500 does not lock the head 300.

As shown in FIG. 8, preferably, the surface of the boss 710 is approximately flush with the outer surface of the body shell 100, and a row of parallel grooves 711 are formed. The grooves 711 can increase friction, which facilitates manual operation. Meanwhile, a flange 712 located on one end is formed on the surface of the boss 710, and the flange 712 protrudes out of the surface of the body shell 100 so as to effectively restrict the finger position of the operator and reduce the difficulty of operation.

The torsion ring 200 needs to be reset after being driven manually through the operating panels 700 to rotate. Therefore, as shown in FIG. 7, the torsion ring 200 is also connected with an energy storage device 400 which drives the torsion ring 200 to reset after rotating. The energy storage device 400 can deform to store energy when the torsion ring 200 is manually rotated. When the external force exerted by hands on the torsion ring 200 is removed, the energy storage device 400 releases the stored energy to make the torsion ring 200 rotate and reset.

The energy storage device 400 can be various elastic parts with elastic deformation capacity, for example, a spring, a torsion spring or an elastic piece. With a common spring in the embodiment as an example: as shown in FIG. 6, the inner part 260 of the arc-shaped through-hole 240 of the torsion ring 200 has two notches 270 located between the two operating panels 700 and spaced. A convex point 290 is formed on the side surface of a partition part 280 between the two notches 270. One end of the spring is sleeved on the periphery of the convex point 290, and the other end of the spring is fixed on or abutted against a support structure 140 in the body shell 100. The support structure 140 can be a groove or a convex point.

As shown in FIG. 7 and FIG. 8, at least one head locking piece 500 can be arranged on the torsion ring 200 by moving in a straight line along the direction perpendicular to the axis of the torsion ring 200. Preferably, the number of the head locking pieces 500 is two, and the two head locking pieces 500 are symmetrically arranged in the arc-shaped through hole 240 between the two operating panels 700. The thickness of the head locking piece 500 is equivalent to the width of the arc-shaped through hole 240. The head locking piece 500 is generally similar to a cuboid block, and the surface towards the inner wall of the body shell 100 is a cambered surface.

As shown in FIG. 7 and FIG. 8, a drive pin 800 parallel to the axis of the torsion ring 200 is also arranged in the arc-shaped through hole 240, and the driven pin 800 passes through an inclined hole or an arc-shaped hole arranged in the head locking piece 500. With an arc-shaped hole 520 as an example, the first end 521 of the arc-shaped hole 520 is close to the cambered surface of the top of the head locking piece, the second end 522 is close to the bottom surface of the head locking piece 500 opposite to the cambered surface, and the drive pin 800 drives the head locking piece 500 to move in a straight line between the first position and the second position during the rotation of the torsion ring 200.

In the first position, as shown in FIG. 4 and FIG. 8, the drive pin 800 is located on the first end of the arc-shaped hole 520, the head locking piece 500 has a blocking part 510 which extends into the jack 220 of the torsion ring 200 and is located on the movement path of the clamping platform 3121 of the head 300. The movement path of the clamping platform 3121 refers to the movement track of the clamping platform 311 in the body shell when the head 300 is inserted into the body shell through the socket of the body shell 100 or pulled out of the socket from the body shell.

As shown in FIG. 4, if the head 300 is inserted into the jack 220 of the torsion ring 200, the blocking part 510 can be embedded in the clamping slot 314 of the head 300, the inner end face of the blocking part 510 is fitted to the outer end face of the clamping platform 3121, and the outer end face 251 of the outer part 250 of the torsion ring 200 is close to or is abutted against the inner end face 3131 of the limiting part 313 so that the blocking part 510 can restrict the clamping platform 3121 so as to restrict the head 300 in the body shell 100.

When the torsion ring 200 rotates clockwise, the drive pin 800 is driven to rotate clockwise and move from the first end of the arc-shaped hole 520 to the second end. Since the head locking piece 500 can only move in a straight line, the head locking piece 500 is jacked up to move to the second position during the rotation of the drive pin 800.

In the second position, the head locking piece 500 does not have a part located on the movement path of the clamping platform 3121. Preferably, the blocking part 510 exits from the jack 220 of the torsion ring 200 and does not restrict the movement of the clamping platform 3121 on the head 300.

Figure 9:
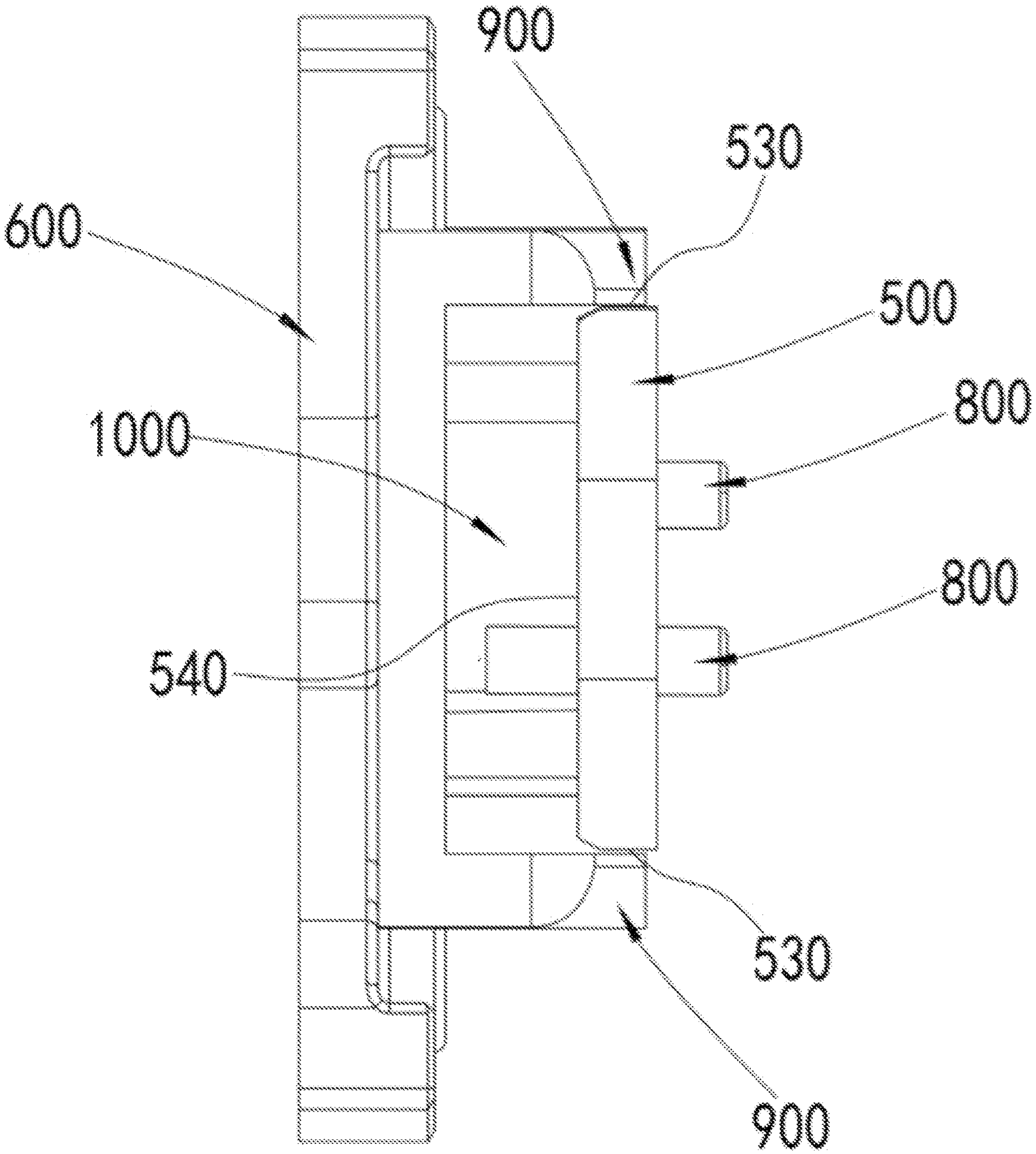
FIG. 9 is a top view of the assembly state of a head locking piece, a drive pin, a guild block, a guild sleeve and a fixed plate of the present invention.

In order to ensure the linear movement of the head locking piece 500, as shown in FIG. 8 and FIG. 9, guide blocks 900 close to two opposite end faces 530 of each head locking piece 500 are arranged in the body shell 100. The two end faces 530 of the head locking piece 500 are flat surfaces parallel to the symmetry axis 150 of the body shell 100. The guide blocks 900 extend from one side of the two notches 270 of the torsion ring 200 to the other side, and the end faces of the guide blocks 900 towards the head locking piece 500 are matched flat surfaces. When the head locking piece 500 moves, the two guide blocks 900 restrict the direction of the head locking piece 500.

In order to guide the head 300 during assembly, as shown in FIG. 8 and FIG. 9, a guide sleeve 1000 coaxial with the drive ring 200 is arranged in the body shell 100. The guide sleeve 1000 extends from the inner end of the torsion ring 200 into the jack of the torsion ring 200. The outer contour of the guide sleeve 1000 can have various feasible polygonal shapes, preferably quadrangle, and is matched with the sleeving part 312 of the head 300 in shape and size. During assembly, the guide sleeve 1000 is coaxially inserted into the sleeving part 312.

Further, as shown in FIG. 9, the guide sleeve 1000 and the guide blocks 900 are located on the same fixed plate 600, the fixed plate 600 is fixed in the body shell 100 and can also be used for fixing the motor, and a hole for the motor shaft or a spline connected to the motor shaft to pass through is formed in the center of the fixed plate 600. As shown in FIG. 5, the spacing between the outer end face (the end face towards the head locking piece) of the fixed plate 600 and the inner end face 540 of the head locking piece 500 is equivalent to the width of the clamping platform 3121 so that the clamping platform 3121 can be effectively restricted between the fixed plate 600 and the head locking piece 500 to ensure the stability of locking.

During assembly in the above structure, it is necessary to manually drive the torsion ring 200 to rotate to make the head locking piece 500 not on the movement path of the clamping platform 3121 of the head 300 so that the head 300 can be inserted into the body shell 100 to realize assembly, which is obviously not convenient for assembly operation.

Figure 10:
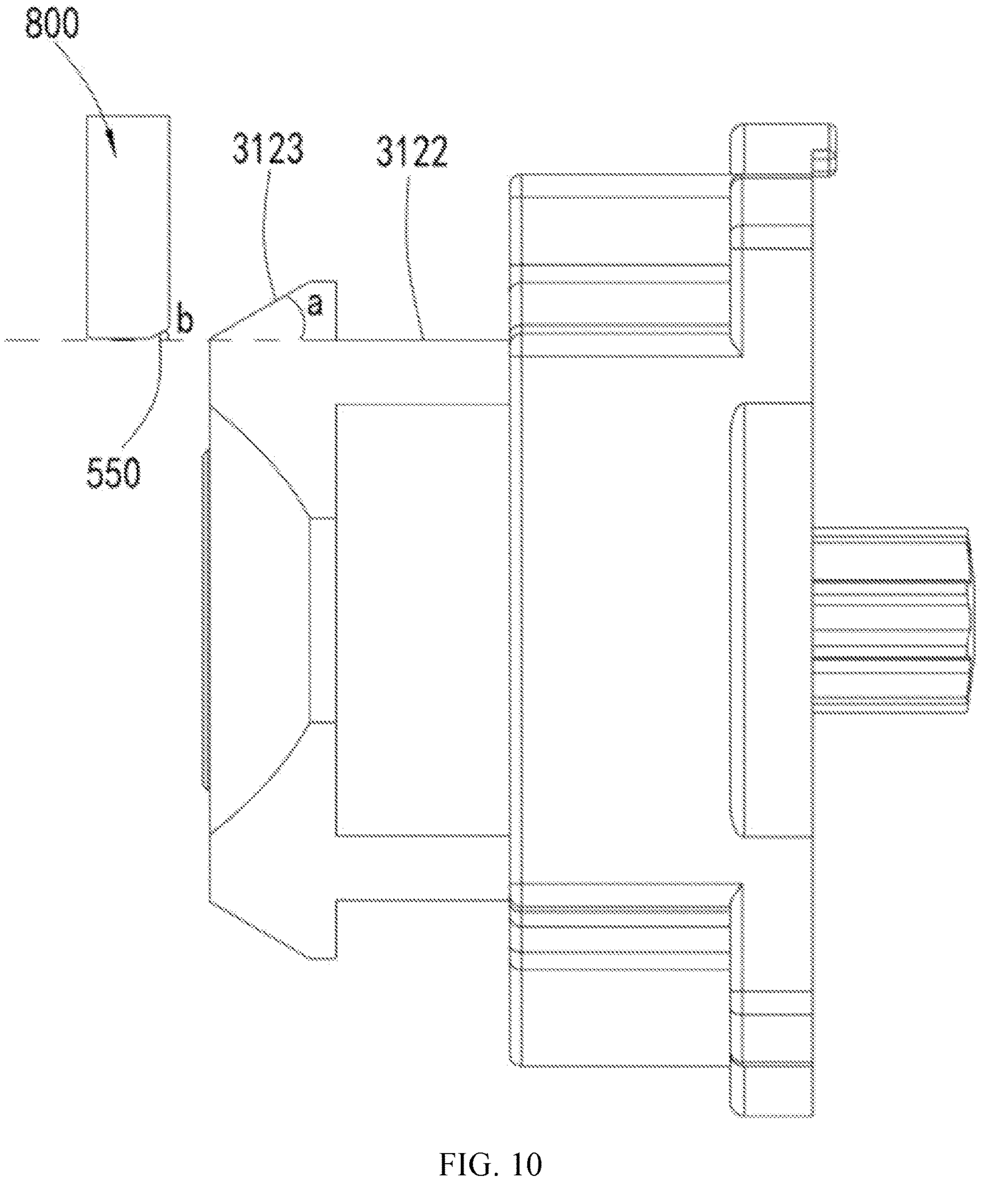
FIG. 10 is a schematic diagram of an automatic locking structure of a connector and a head locking piece of the present invention.

Therefore, in the preferred mode, as shown in FIG. 10, an inclined plane 3123 leaning from the inner end to the outer side of the outer end is formed on part or all of the clamping platform 3121 of the head 300, and the head locking piece 500 has chamfers matched with the inclined plane 3123. Further, the included angle a between the inclined plane 3123 and the side wall 3122 where the clamping platform 3121 is located is greater than the included angle b between an inclined plane 550 corresponding to the chamfers and the side wall 3122.

Therefore, when the head 300 moves into the torsion ring 200, the inclined plane 3123 is in contact with the inclined plane 550 and drives the head locking piece 500 to move away from the axis of the torsion ring 200, i.e., the head locking piece 500 moves from the first position to the second position, and the torsion ring 200 rotates and exerts pressure on the energy storage device 400 to make the energy storage device 400 deform to store energy.

With the continuous movement of the head 300 into the body shell 100, the head locking piece 500 moves to the top of the inclined plane 3123 (with the maximum distance from the side wall 3122 where the clamping platform 3121 is located). Then, after moving to the inner side of the head locking piece 500, the clamping platform 3121 no longer provides support force to the head locking piece 500 so that the energy storage device 400 releases the stored energy to drive the torsion ring 200 to rotate reversely and drive the head locking piece 500 to move towards the axis of the torsion ring 200, i.e., the head locking piece 500 moves from the second position to the first position. At this time, the head locking piece 500 has an overlapping part with the clamping platform 3121 and is located on the outer side of the clamping platform 3121 so as to restrict the head 300 in the body shell 100.

The solution further discloses a multi-functional power tool, as shown in FIG. 1 and FIG. 2, comprising the above head and body rapid replacing structure of a multi-functional power tool. A motor 4000, a transmission structure (marked in the figure), a control panel and other conventional power tools are arranged in the body shell 100. The body shell 100 is provided with a start key 6000 protruding out of the body shell 100 to control the start and stop of the motor 4000 and a steering switch key 2000 with both ends protruding out of the main body of the shell to control the forward and reverse rotation and locking of the motor 4000. Generally, when the steering switch key 2000 is located in the middle position (the locked position), the handheld tool is locked, and the start key 6000 cannot control the rotation of the motor; when the steering switch key 2000 is located in the left position (the forward rotation position), the start key 6000 can control the forward rotation of the motor; and when the steering switch key 2000 is located in the right position (the reverse rotation position), the start key can control the reverse rotation of the motor. The whole handheld tool can be powered by a known method of being connected to the mains supply through a power line and/or by batteries. The motor 4000, the control panel, the start key 6000, the steering switch key 2000 and the power supply structure all have conventional configurations of various handheld tools, which is not the design point of the solution and will not be repeated here.

Further, other structures of conventional handheld tools can also be arranged on or in the body shell 100, such as torque transmission structure, clutch mechanism, torque adjustment mechanism and lighting.

The head 300 can be known heads with various functions. A transmission structure that can be connected with the motor 4000 is arranged in the head 300, so as to transfer the torque of the motor to working heads such as drill, reciprocating saw blade, grinding disc and punch installed on the head 300 and to drive the working heads to rotate or reciprocate.

A torque output structure which can be directly or indirectly connected with the motor and transmits torque is arranged in the head 300 with different functions, for example, as shown in FIG. 2, the rotating shaft of the motor 4000 is coaxially connected with a spline 5000, and an output shaft 7000 is coaxially and rotationally arranged in the head 300. When the head 300 is fixed in the main shell, the spline 5000 coaxially fixed on the rotating shaft of the motor 4000 is inserted into a spline groove formed at the inner end face of the output shaft 7000 to realize power transmission. The torque output structure can output the rotational motion of the motor in forms such as reciprocating linear motion or swing motion, and the corresponding structure is the known technology, which is not the design point of the solution and will not be repeated here. Of course, the connecting structure of the torque output structure in the head 300 and the motor can also refer to the torque output structures disclosed by the prior art with the application No. of 981185789, 991005600, 011119624 and 2007200359081.

After the tool holder of part of the head 300 such as a polisher and a circular saw is assembled in the body shell 100 and is in torsion transmission connection with the motor, the motor is only required to rotate in one direction, and accordingly, a certain steering control mechanism is required to achieve the above purpose.

Figure 11:
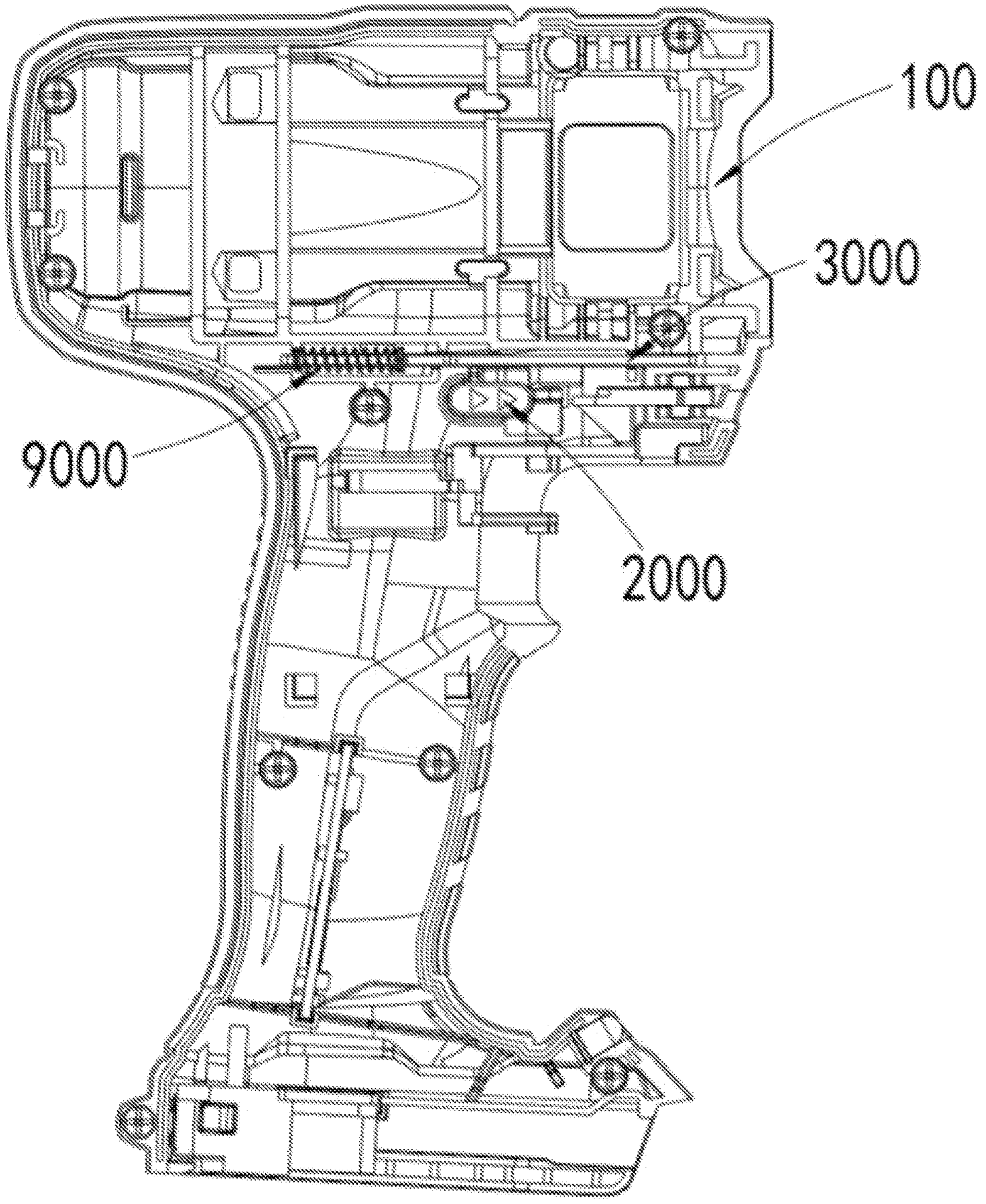
FIG. 11 is a schematic diagram of a steering switch key and a steering switch locking piece on a body shell of the present invention.

Specifically, as shown in FIG. 11, the steering control mechanism comprises the steering switch key 2000 arranged on the body shell 100, a steering switch locking piece 3000 is arranged at the socket of the body shell 100 and driven by an elastic part 9000 to reset after moving, and the steering switch locking piece 3000 can be driven to move in a straight line between the third position and the fourth position.

In the third position, the steering switch locking piece 3000 does not restrict the movement of the steering switch key 2000.

In the fourth position, the steering switch locking piece 3000 restricts the steering switch key to a forward rotation position or a reverse rotation position, or restricts the steering switch key 2000 to a locked position and to movement to only one side.

As shown in FIG. 11, the steering switch locking piece 3000 is located at the socket of the body shell 100 in butt joint with different tool holders, and the body shell 100 is provided with a guide structure which guides the steering switch locking piece 3000, for example, a group of locating notches or a locating slot arranged in the inner wall of the body shell 100 to ensure that the steering switch locking piece 3000 can reciprocate along the direction parallel to the axis of the torsion ring.

Figure 12:
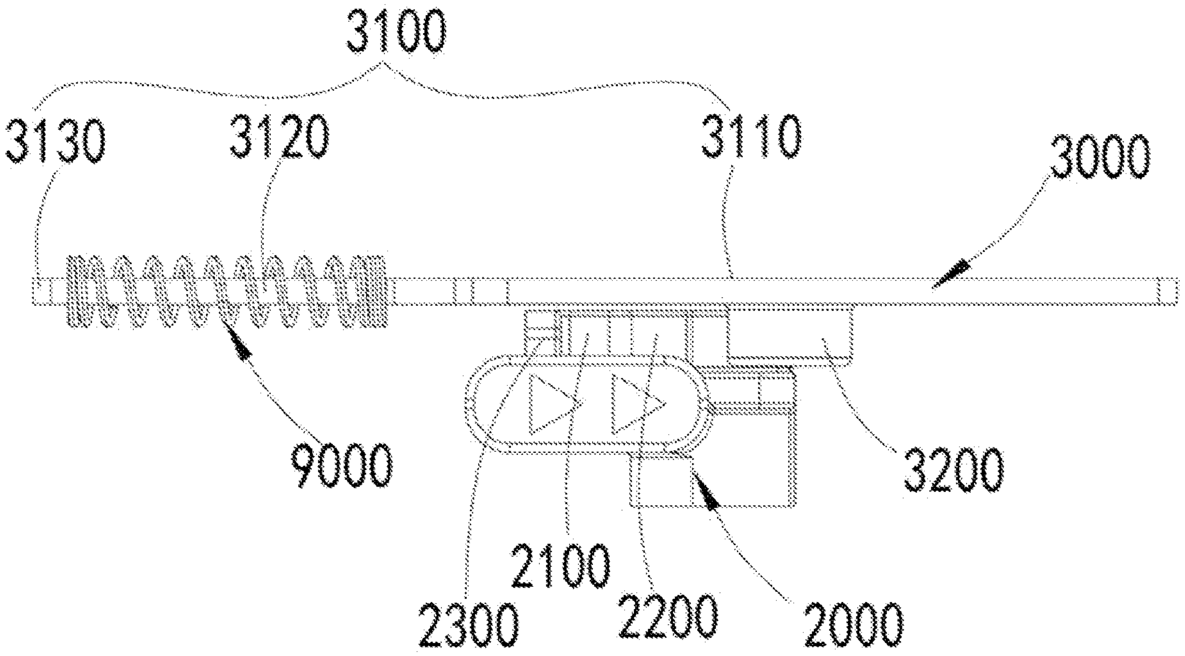
FIG. 12 is a main view of a steering switching key and a steering switch locking piece of the present invention.

As shown in FIG. 12, the steering switch locking piece 3000 comprises a main plate 3100 and a blocking part 3200 located on the bottom surface thereof, the main plate 3100 comprises a front end plate 3110 and a back end plate 3120, a bending part 3130 is formed on the end of the back end plate 3120, and the blocking part 3200 has the shape of cylinder or prism, preferably cylinder.

Meanwhile, as shown in FIG. 12, the main plate 3100 is maintained in the third position through the elastic part 9000 abutted thereagainst, and the elastic part 9000 can be an elastic element that deforms under pressure and automatically recovers after the pressure is eliminated, for example, a spring, an elastic metal piece or even sponge, preferably a spring. The spring is sleeved on the periphery of the back end plate 3120, one end of the spring is abutted against the step surface of the front end of the back end plate 3120, and the other end is abutted against a baffle plate 150 formed on the inner wall of the body shell 100. Therefore, when the front end of the main plate 3100 is subjected to an external force, the main plate 3100 can move into the shell; and when the external force is eliminated, the elastic part 9000 makes the main plate 3100 move and reset.

Figure 13:
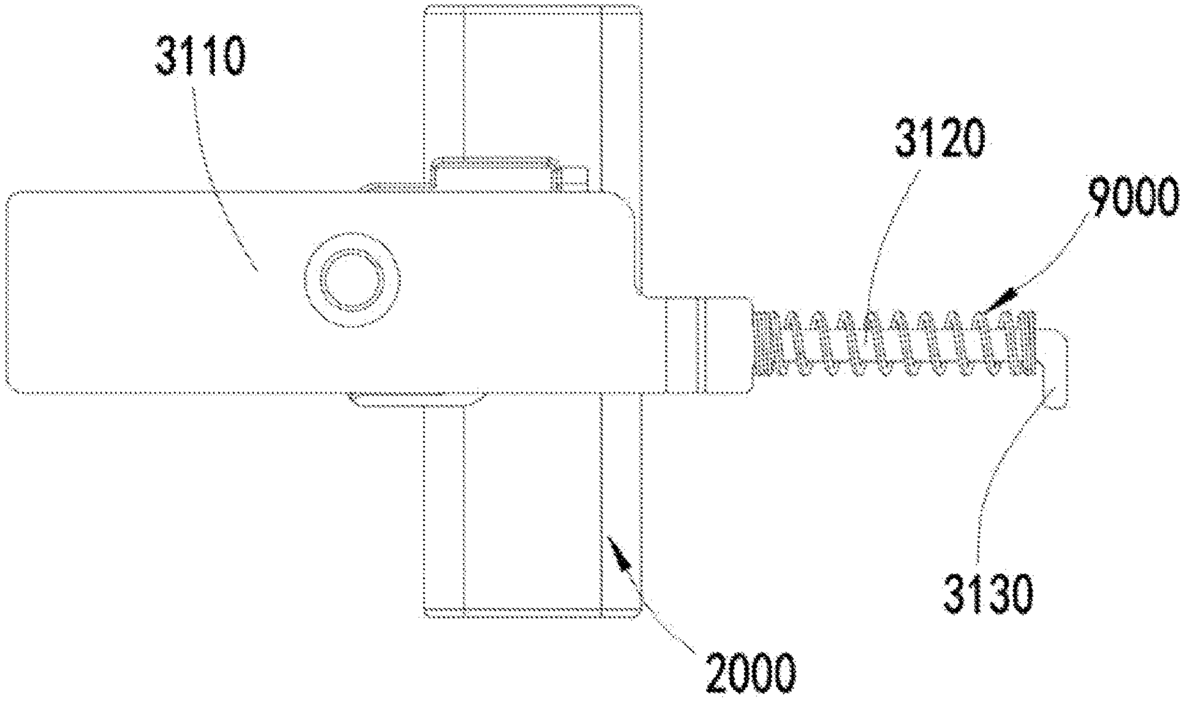
FIG. 13 is a top view of a steering switching key and a steering switch locking piece of the present invention.
Figure 14:
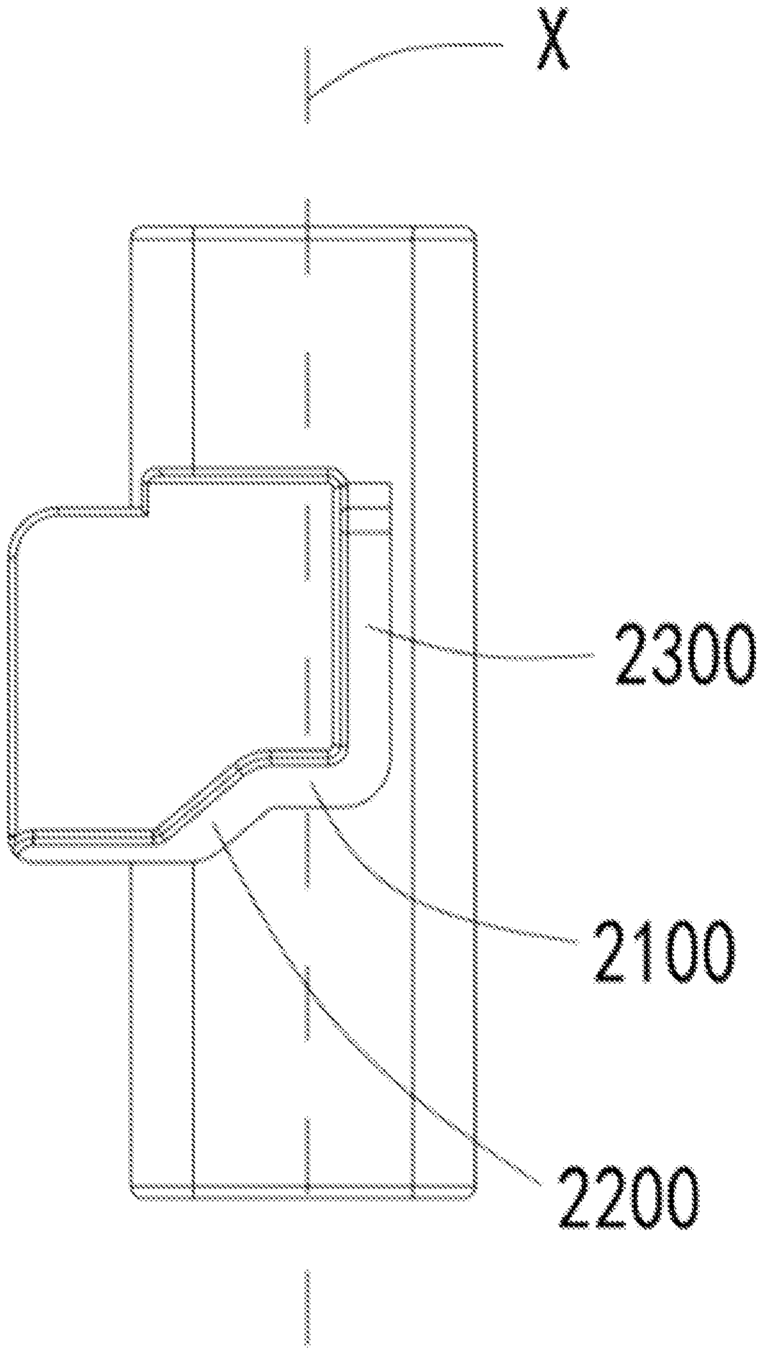
FIG. 14 is a top view of a steering switch locking piece of the present invention.

As shown in FIG. 12 and FIG. 13, during the movement of the main plate 3100, the blocking part 3200 thereon restricts the moving range of the steering switch locking piece 2000 or drives the steering switch locking piece 2000 to move to a fixed position. Correspondingly, the steering switch locking piece 2000 has a structure corresponding to the blocking part 3200. As shown in FIG. 12 and FIG. 14, the steering switch locking piece 2000 at least comprises a first baffle plate 2100 perpendicular to the axis X of the steering switch locking piece 2000. When the steering switch locking piece 2000 is located in the middle position, the first baffle plate 2100 is located on one side (the left side as shown in the figure) of the blocking part 3200; when the steering switch locking piece 3000 is located in the first position, i.e., the elastic part 9000 is in the natural state, the blocking part 3200 is not in contact with the first baffle plate 2100 of the steering switch locking piece 2000 located in the middle position, and the first baffle plate 2100 is fully misaligned with the blocking part 3200, i.e., the blocking part 3200 is not on the movement path of the first baffle plate 2100 so that the first baffle plate 2100 can move freely.

When the steering switch locking piece 3000 is located in the second position, the blocking part 3200 moves to the movement path of the first baffle plate 2100 so as to restrict the first baffle plate 2100 of the steering switch locking piece 2000 located in the middle position to move from the locked position to one side.

Or during the movement, the blocking part 3200 drives the first baffle plate 2100 of the steering switch locking piece 2000 located in the middle position to move from the middle position to one side and then restrict the first baffle plate 2100. At this time, the blocking part 3200 needs to be provided with a corresponding inclined plane so as to drive the first baffle plate to move during contact with the first baffle plate. Of course, in another embodiment, as shown in FIG. 12 and FIG. 14, the first baffle plate 2100 can also be connected with an inclined plate 2200 which deviates from the blocking part 3200, and when the steering switch locking piece 2000 is located in the middle position, the inclined plate 2200 is aligned with the blocking part 3200 so that the blocking part 3200 is in contact with the inclined plate 2200 when moving along the direction parallel to the axis of the torsion ring 200 so as to drive the inclined plate 2200 to finally drive the whole steering switch locking piece 2000 to move from the middle position to one side with continuous inward sliding.

In addition, when the steering switch locking piece 3000 is located in the first position, the blocking part 3200 is not on the movement path of the inclined plate 2200 so as not to restrict the movement of the inclined plate 2200. When moving to the movement path of the inclined plate 2200, the blocking part 3200 can restrict the movement of the whole steering switch locking piece 2000. As the blocking part 3200 further moves into the body shell, the blocking part 3200 can push the inclined plate 2200 so as to drive the whole steering switch locking piece 2000 to move from the middle position to one side. Therefore, the structure can effectively meet the requirements of different tool holders for the corresponding operation, i.e., a choice can be made between two operating states of the steering switch locking piece 2000 by making the blocking part 3200 move for different stokes. In one state, the steering switch locking piece 2000 can move between the middle position and the forward rotation position or move between the middle position and the reverse rotation position; and in the other state, the steering switch locking piece 2000 only can be located in the forward rotation position or the reverse rotation position.

Further, as shown in FIG. 12 and FIG. 14, the inner end of the first baffle plate 2100 is connected with a second baffle plate 2300 perpendicular thereto, the second baffle plate 2300 restricts the movement stroke of the steering switch locking piece 3000, i.e., when the blocking part 3200 is abutted with the second baffle plate 2300, the blocking part 3200 is restricted so that the whole steering switch locking piece 3000 cannot continue to move.

Furthermore, the head 300 of the power tool, which requires only one-way rotation of the motor, is provided with a drive part matched with the steering switch locking piece 3000, and the drive part is a drive plate corresponding to the main plate 3100. When the head 300 is connected with the body shell 100 into a whole, the drive part is abutted with the main plate 3100 and pushes the main plate 3100 to move into the body shell 100, i.e., from the third position to the fourth position. Preferably, the tool holders provided with the drive part 320 are a circular saw tool holder, a sander tool holder and a polisher tool holder.

The present invention still has many embodiments. All technical solutions formed by adopting identical transformation or equivalent transformation shall be included in the protection scope of the present invention.

What is claimed is:

1. A head and body rapid replacing structure of a multi-functional power tool, comprising:

a body shell (100);

a torsion ring (200) which is rotationally arranged in the body shell and near a socket of the body shell and of which the axis is at least parallel to that of the socket;

a head (300) detachably inserted in a jack (220) of the torsion ring (200), wherein a shell of the head comprises a connector, the connector comprises a square sleeving part and a limiting part, a clamping platform extending from an inner end to an outer end for a certain distance is formed on at least one side wall of the sleeving part, and a clamping slot is formed between the clamping platform and an inner end face of the limiting part;

an energy storage device (400) resetting after driving the torsion ring (200) to rotate;

head locking pieces (500) that can move in a straight line between a first position and a second position along the direction perpendicular to the axis of the torsion ring (200) during the rotation of the torsion ring (200);

in the first position, each head locking piece (500) has a blocking part which is located on the movement path of the clamping platform of the head (300) in the jack (220);

in the second position, each head locking piece (500) does not have a part located in the movement path of the clamping platform, a fixed plate coaxial with the torsion ring is arranged in the body shell, and the spacing between the fixed plate and the head locking piece is equivalent to the width of the clamping platform.

2. The head and body rapid replacing structure of a multi-functional power tool according to claim 1, wherein the outer circumferential surface of the torsion ring (200) is provided with an operating panel (700).

3. The head and body rapid replacing structure of a multi-functional power tool according to claim 1, wherein an arc-shaped through hole for installing the head locking piece (500) is formed in the torsion ring (200), and the sum of the thickness of the outer part of the arc-shaped through hole and the thickness of the head locking piece (500) is equal to the width of the clamping slot on the head (300).

4. The head and body rapid replacing structure of a multi-functional power tool according to claim 1, wherein the head locking piece (500) has an arc-shaped hole or an inclined hole, a drive pin (800) parallel to the axis of the torsion ring is inserted into the arc-shaped hole or the inclined hole, and the drive pin (800) drives the head locking piece (500) to move between the first position and the second position during the rotation of the torsion ring.

5. The head and body rapid replacing structure of a multi-functional power tool according to claim 1, wherein guide blocks (900) close to two opposite end faces of the head blocking piece (500) are arranged in the body shell (100).

6. The head and body rapid replacing structure of a multi-functional power tool according to claim 1, wherein a guide sleeve (1000) coaxial with a drive ring is arranged in the body shell (100), and the head (300) has a hole matched with the guide sleeve (1000).

7. The head and body rapid replacing structure of a multi-functional power tool according to claim 1, wherein an inclined plane leaning from the inner end to the outer side of the outer end is formed on the clamping platform, and the head blocking piece (500) has chamfers matched with the inclined plane.

8. The head and body rapid replacing structure of a multi-functional power tool according to claim 1, wherein the body shell (100) is provided with a steering switch key (2000), and the end with the socket of the body shell (100) is provided with a steering switch locking piece (3000) which can be driven to move in a straight line between a third position and a fourth position;

in the third position, the steering switch locking piece (3000) does not restrict the movement of the steering switch key (2000);

in the fourth position, the steering switch locking piece (3000) restricts the steering switch key to a forward rotation position or a reverse rotation position, or restricts the steering switch key (2000) to a locked position and to movement to only one side.

9. A multi-functional power tool, comprising the head and body rapid replacing structure of a multi-functional power tool of claim 1.

* * * * *